United States Patent

Hamisch

[11] 4,167,024
[45] Sep. 4, 1979

[54] SYSTEM FOR RECORDING OR REPRODUCTION OF SIGNALS BY MEANS OF POLARIZED LIGHT BEAMS

[75] Inventor: Hansjoachim Hamisch, Berlin, Fed. Rep. of Germany

[73] Assignee: Robert Bosch GmbH, Stuttgart, Fed. Rep. of Germany

[21] Appl. No.: 820,395

[22] Filed: Jul. 29, 1977

[30] Foreign Application Priority Data

Jul. 30, 1976 [DE] Fed. Rep. of Germany ....... 2634243

[51] Int. Cl.² .......................... G11B 7/20; G11B 21/10
[52] U.S. Cl. .............................. 358/128; 179/100.3 B; 179/100.3 T; 235/462; 250/225; 346/76 L; 350/152; 365/121
[58] Field of Search ................. 179/100.3 B, 100.3 T, 179/100.3 V, 100.3 G; 358/128; 365/121, 122, 215, 234, 127; 235/462, 467; 250/225, 204; 356/114; 346/76 L, 108; 350/150, 152; 360/77

[56] References Cited

U.S. PATENT DOCUMENTS

| | | |
|---|---|---|
| 3,348,217 | 10/1967 | Snaper .......................... 365/127 X |
| 3,438,050 | 4/1969 | Aschenbrenner et al. ...... 365/234 X |
| 3,629,517 | 12/1971 | Grimm ............................. 365/122 X |
| 3,696,346 | 10/1972 | Zook .................................... 365/122 |
| 3,919,698 | 11/1975 | Bricot et al. .................. 179/100.3 V |
| 3,971,002 | 7/1976 | Bricot et al. .................. 179/100.3 G |
| 3,994,565 | 11/1976 | Van Doorn et al. ............. 350/150 X |
| 4,001,493 | 1/1977 | Cone .............................. 179/100.3 V |
| 4,037,252 | 7/1977 | Janssen ................................ 358/128 |
| 4,054,367 | 10/1977 | Eschler et al. ....................... 350/150 |
| 4,084,185 | 4/1978 | de Lang et al. ...................... 358/128 |
| 4,085,423 | 4/1978 | Tsunoda et al. ..................... 358/128 |

*Primary Examiner*—Bernard Konick
*Assistant Examiner*—Donald McElheny, Jr.
*Attorney, Agent, or Firm*—Michael J. Striker

[57] ABSTRACT

Information is converted from electrical-signal form to recorded form, or from recorded form to electrical-signal form. A beam of light emitted by a light source is split into two component light beams each having a different respective polarization plane, and the differently polarized component light beams are projected side by side onto respective adjoining portions of a recording medium.

18 Claims, 3 Drawing Figures a)

b)

c)

d)

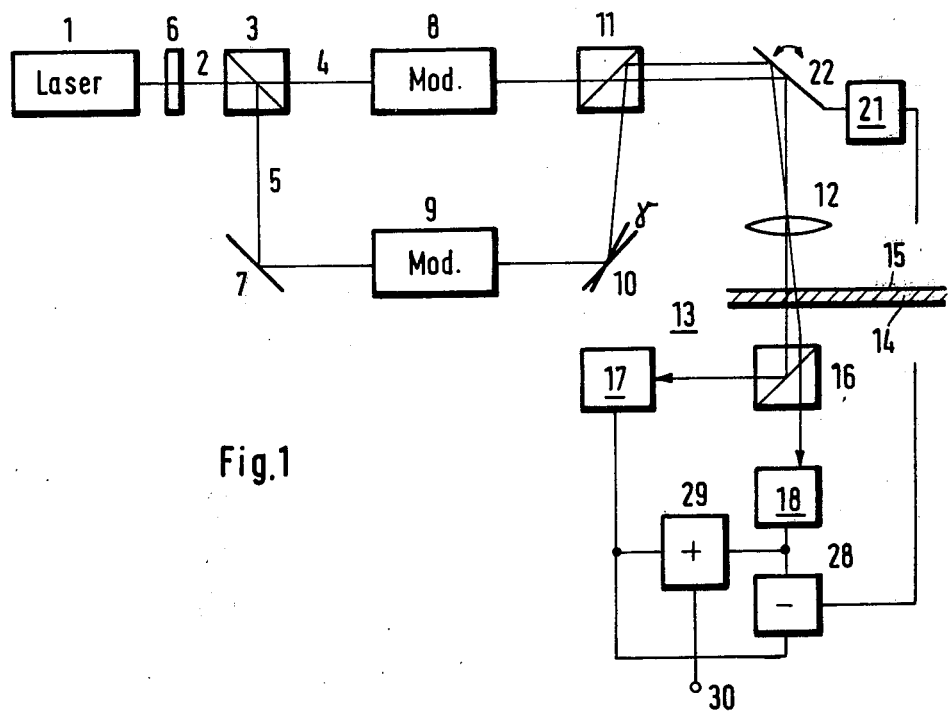
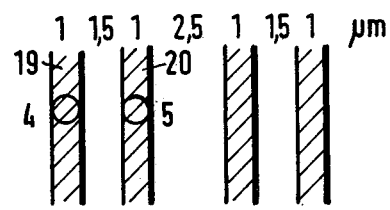
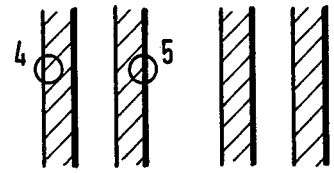
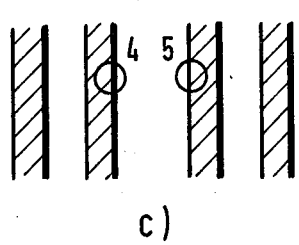
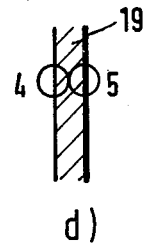
Fig.1
Fig.2

SYSTEM FOR RECORDING OR REPRODUCTION OF SIGNALS BY MEANS OF POLARIZED LIGHT BEAMS

BACKGROUND OF THE INVENTION

The present invention relates to a system for recording signals on a recording medium using light beams, and likewise for converting recorded information into signals using light beams.

It has already been proposed to use a modulated laser beam to record signals on a recording medium of preferably disk-shaped configuration. This system makes possible a very high density of recorded information, but inherently requires very great mechanical precision, both in manufacture and in use, particularly for causing the beams to properly track information tracks on the recording medium. Additionally, this system is not suitable when, as in many practical applications, it is necessary to be able to simultaneously form two recording tracks which, because of the high information density involved, must be extremely closely spaced.

German published patent application DT-OS No. 2,341,571 discloses another system, in which a laser beam is split into two beams of mutually perpendicular polarization. These beams are then modulated in such a manner that one or the other of the beams can be used to record upon the recording medium, and in particular in such a way that they are alternately available for the recording of a bit in one or else the other of two tracks, respectively corresponding to logical "0" and "1" signals; the system in question does not have the capability of producing two tracks of recorded information simultaneously. Additionally, this known system has not solved important problems relating to automatic tracking, i.e., causing the modulated beam to accurately track the recording track upon which information is to be recorded.

SUMMARY OF THE INVENTION

It is a general object of the invention to provide a system having the capability of recording information on two extremely closely spaced adjoining recording tracks (a recording track-pair) on a recording medium, with the information to be recorded on each of the two tracks being independent of the information on the other of the two tracks; or conversely, reading thusly recorded information and converting it into electrical signals.

According to one concept of the invention, this is achieved by splitting a beam of light emitted by a light source into two component light beams each having a different respective polarization plane, and projecting the differently polarized component light beams side by side onto respective adjoining portions of a recording medium.

According to another concept of the invention, use could be made of a modulator arranged in the beam path of a laser operative for identically modulating the two component light beams, to effect the recording of identical information in the two, extremely closely spaced tracks of the track-pair. Although this alternative inherently tends to reduce information density, it creates important possibilities with regard to counteracting interference signals, recording-medium flaws (drop-outs), recording and reproduction errors, and the like.

According to a further concept of the invention, the two differently polarized component light beams are maintained spaced apart from each other a certain distance during recording and during reproduction, and this certain distance is slightly different, relative to the spacing between the adjoining tracks of a track-pair, for recording and for reproduction. This expedient creates the possibility of deriving from the reproduced signals control signals which can be utilized for automatic tracking, i.e., for causing the two differently polarized component light beams to accurately track the respective tracks of a track-pair.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 depicts an exemplary system in which the differently polarized component light beams are operative by penetration of or transmission through the recording medium;

FIGS. 2a to 2d are diagrams illustrating certain features of track-pair recording and reproduction.

DESCRIPTION OF THE PREFERRED EMBODIMENTS

Figure 3:
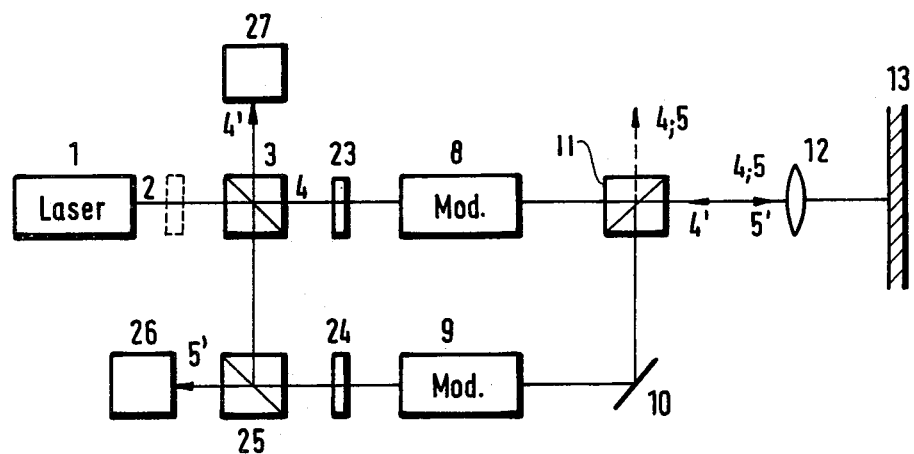
FIG. 3 depicts an exemplary system in which the differently polarized component light beams are operative by reflection from the recording medium.

In the exemplary system depicted in FIG. 1, a laser 1 emits a laser beam 2. A polarization beam splitter 3 splits the laser beam into two component beams 4 and 5, the respective polarization planes of which are mutually perpendicular. This presupposes, for example, that the polarization plane of the light beam 2 entering the beam splitter 3 is oriented at an angle of 45° relative to the principal or preferential directions of the beam splitter 3. In the event that the laser 1 furnishes a beam 2 which, for example, has a polarization plane whose direction is parallel to one of the principal or preferential directions of beam splitter 3, then a quarter-wave plate 6 is included between the laser 1 and the beam splitter 3, as shown in FIG. 1.

The component beam 5 is deflected by a mirror 7 into a side path which extends parallel to the path of the other component beam 4, which latter coincides with the beam path of the laser beam 2. Two modulators 8 and 9 are located in the respective paths of the two component beams 4, 5; such modulators are conventional in this art, and are disclosed for example in "duenne Schichten fuer die Optik," H. Anders, Viss. Verlagsges., Stuttgart, 1965, p. 88, and their operation need not be explained in detail here. Similar comments apply to the polarization beam splitters, which may be essentially comprised of two prisms at whose interface a plurality of very thin layers of optical material are provided.

By means of a second mirror 10, the second component beam 5 is deflected back toward the path of first component beam 4, and by means of a beam-splitting prism 11 reintroduced into the direct light path between the laser 1 and the objective 12. The angle between the two component beams 4, 5 in the direct light path is adjusted by adjusting the angular setting γ (gamma) of the mirror 10, in such a manner that the two light spots projected by objective 12 onto the recording medium 13 will have a desired spacing (discussed below) as measured perpendicular to the writing direction. In FIGS. 1 and 3, the writing direction is perpendicular to the plane of illustration; i.e., the two component beams 4, 5 incident upon the recording medium 13 are deflected leftward and rightward as seen in FIG. 1, whereas the recording medium 13 is transported in a direction perpendicular to the plane of illustration of FIG. 1.

When the system of FIG. 1 is employed for recording, the light beams 4, 5 incident upon the recording medium 13 alter the characteristics of the recording medium in per se conventional manner. For example, the recording medium 13 may comprise a carrier 14 for a photosensitive layer 15 whose chemical composition is altered by the incident laser light, so that upon subsequent development of the recording medium the portions thereof exposed to laser light will be distinguishable from those not exposed to laser light (i.e., photographic recording). Another conventional recording technique involves selection of the material of layer 15 and of the laser beam intensity such that the portions of layer 15 exposed to laser light vaporize, so that if the carrier 14 is of transparent material a readable (i.e., transducer-readable) recording is immediately created, which can then be used for reproduction by means of beams transmitted through the recording medium and incident upon optoelectrical transducers. It is also known in the art to cause incident laser light to alter the degree of reflection of the recording medium, making possible subsequent reading of the recorded information using reflected-light techniques; this is particularly advantageous when it is desired to be able to record and then read information on both sides of the recording medium.

The concepts of the invention are applicable to both types of conventional recording technique, as shown in FIGS. 1 and 3. Likewise, the form of the recording medium is not critical. Whereas recording disks are particularly referred, the invention is not limited thereto.

In order to be able to once more split the two differently polarized component beams 4, 5, after they have been transmitted through the recording medium, use is made of a third polarization beam splitter 16, from the exit faces of which the component beams 4, 5 are routed onto respective ones of two optoelectrical transducers 17 and 18.

When two recording tracks (constituting a track-pair) are to be recorded upon, whether with different information (e.g., for certain digital recording applications) or with identical information (e.g., to reduce error), the angle of mirror 10 is adjusted to establish the requisite spacing between the two tracks of a track-pair (see FIG. 2a). As shown in FIG. 2a, the spacing between the two tracks of a track-pair can for example be 1.5 microns, the spacing between adjoining track-pairs 2.5 microns, and the breadth of each individual track 1 micron.

To scan thusly recorded track-pairs, the angle of mirror 10 can then be altered to such an extent that the spacing between the two component beams 4, 5 for reproduction is about 0.3 microns greater than for recording; this greater spacing for reproduction is shown in FIG. 2b. As will be seen, each of the component beams 4, 5, when used for reading of the track-pair, is partly incident upon the associated track of the track-pair and partly incident upon a portion of the recording medium to a respective side of the associated track.

If, in the reading situation shown in FIG. 2b, the two component beams 4, 5 are improperly incident leftward of the illustrated proper position, then the signal derived from beam 4 will become smaller and that derived from beam 5 will become larger. These variations, however, are superimposed upon the modulation attributable to the recorded signals per se, so that the superimposed signal components indicative of improper tracking can be filtered out and utilized for corrective action. For example, if the information recorded on tracks 19, 20 is frequency-modulated, the aforementioned signal variation will be in the form of a change of amplitude of the frequency-modulated signal derived from the recording medium; likewise, if the information in the two tracks of a track-pair is in digital form, the amplitude of the bits derived from the two component beams will change; if the information in the two tracks of a track pair is identical (to reduce error) and for example amplitude-modulated, then a tracking error will produce an inequality in the two signals derived from the two component beams 4, 5.

Accordingly, the output signals from the two optoelectrical transducers 17, 18 are applied to a subtractor 28, at whose output is produced an error signal for automatic tracking correction. This error signal is applied to an actuator stage 21, which adjusts the angular setting of deflecting mirror 22 in dependence upon the error signal, in a sense reducing the tracking error. The actuator stage is, for example, a piezoelectric positioning device.

Thus, the negative-feedback tracking system is in a stable state when the two component beams 4, 5 are each properly tracking a respective one of the two tracks 19, 20 of a track-pair, i.e., as shown in FIG. 2b. In contrast, if the component beams 4, 5 are each tracking a track of a different one of two adjoining track-pairs (as shown in 2c), the negative-feedback tracking system is in an unstable state, and the actuator 21 will automatically adjust the angular setting of mirror 22 in a sense causing the pair of component beams 4, 5 to shift onto a single track-pair.

Specifically: In the stable situation of FIG. 2b, and disturbance (beam or track shift) which causes the signal from beam 5 to be greater than that from beam 4, results in an error signal which commands that the component-beam-pair 4, 5 shift rightward, i.e., back to the correct tracking position, and resulting in a corresponding decrease of the error signal during the corrective rightward shift. The error signal behaves differently in the unstable situation of FIG. 2c. Here, any disturbance (beam or track shift) which causes the signal from beam 5 to be greater than that from beam 4, likewise results in an error signal which commands that the beam-pair 4, 5 shift rightward; however, during this rightward shift, the error signal does not decrease and instead increases, so that the rightward shift continues until the beam-pair 4, 5 is incident upon a single track-pair, after which the rightward shift continues but now accompanied by a decrease of the error signal until the stable state of FIG. 2b is again assumed.

Using the illustrated systems, it would in principle also be possible to form the two tracks of a track-pair one after the other, by first blocking one component beam 4 and then blocking the other component beam 5, for example using the modulators 8, 9 themselves. In that event, the negative-feedback tracking action described above would not be available, and resort must then be had to a different tracking control technique. For example, during the recording of the second track of a track-pair, the already recorded first track of the track-pair can be sensed, with the beam being rapidly deflected transverse to the recording direction (deflected left and right in FIG. 1) at a frequency of about 20-kHz, and with the resultant output signal being applied to a phase comparator or phase-locked demodulator from which the requisite error signal for tracking correction would then be derived. This 20-kHz transverse deflection of the component beam used for sensing of the first-recorded track of the track-pair during the recording of the second-recorded track of the track pair, can be accomplished by oscillating the mirror 10 at the frequency in question. Inasmuch as the total range of angular settings of mirror 10 involved in this oscillation will be very small, the oscillation is advantageously established by applying an oscillating voltage to a piezoelectric element coupled to the pivotally mounted mirror 10.

The polarization beam splitter serves as an analyzer for the modulators 8, 9 in the event that the modulators are for example Pockel-effect modulator crystals, i.e., if the modulators employed are of the type which do not primarily modulate the intensity of the transmitted beam but instead its polarization direction.

The inventive system can also be employed for automatic tracking control during reproduction of signals from a single track of recorded information, such as shown in FIG. 2d. The recording of single tracks of information can be performed using conventional prior-art systems; it could also be performed using one of the inventive systems, by setting the mirror 10 to the 45° angular setting thereof or by interrupting the second component beam 5, for example blocking it by means of associated modulator 9. In any event, for the situation of FIG. 2d, the sum of the output signals produced by transducers 17, 18 and formed by adder 29 can be used to derive the actual output signal on output terminal 30, whereas the difference between the signals or components thereof can be used for negative-feedback tracking control, i.e., in the same way as already described with respect to FIGS. 2a to 2c.

The exemplary system depicted in FIG. 3 operates on the reflected-beam principle, in contrast to the transmitted-beam principle of FIG. 1. Insofar as recording is concerned, the system of FIG. 3 operates like that of FIG. 1; i.e., the light emitted from laser 1 is split by the beam splitter 3 into component beams 4 and 5, which are then modulated by modulators 8 and 9 with the information to be recorded, and then recombined by means of the beam splitter 11. The objective 12 projects and focuses the requisite writing light-spots. The incident light alters the reflective characteristics of the recording medium in per se conventional manner. The incident component beams are again slightly spaced, but inasmuch as the spacing is on the order of several microns, it is not apparent from FIG. 3, unlike FIG. 1 where the spacing is shown exaggerated for purposes of explanation.

To reproduce the recorded signals, quarter-wave plates 23, 24 are introduced into the paths of the component beams 4, 5; additionally, in contrast to the system shown in FIG. 1, the mirror 7 of FIG. 1 is replaced by a third polarization beam splitter 25. The quarter-wave plates serve to circularly polarize the component beams 4, 5, as a result of which only half the energy entering the beam splitter 11 can actually reach the recording medium 13. However, this low power efficiency is not actually a problem, because for reproduction very low power is anyway transmitted by the beams, i.e., in contrast to the power which they must transmit for recording.

The incident component beams 4, 5 are reflected back from the recording medium 13 as reflected component beams 4', 5'. In travelling through the beam splitter 11, the reflected component beams 4', 5' are again split apart. The reflected component beam 4' travels through the associated modulator 8 (to which no modulating signal is applied for reproduction) and through the quarter-wave plate 23 to the beam splitter 3, from where it is routed onto the associated optoelectrical transducer 27. The reflected component beam 5' is reflected by the beam splitter 11 to the mirror 10, reflected from the latter through the associated modulator 9 (to which likewise no modulating signal is now being applied) and through the quarter-wave plate 24. The quarter-wave plate 24 circularly polarizes the reflected component beam 5', so that when the latter passes through beam splitter 25 only half of its energy is transmitted to its associated optoelectrical transducer 26. The half of component beam 5' not transmitted directly through beam splitter 25 is reflected by the latter, and by beam splitter 3, onto the laser source 1, upon which it has no particular effect. It will be understood that if the component beam 4 is incident normal upon the reflective recording medium, its corresponding reflected component beam 4' will be reflected back coincident with beam 4. In that event, although the other component beam 5 will not actually be incident exactly normal upon the recording medium, the smallness of the spacing of the two beams (on the order of microns) is such that, for all practical purposes, the reflected component beam 5' follows a path coincident with that of transmitted beam 5.

It will be understood that each of the elements described above, or two or more together, may also find a useful application in other types of circuits and constructions differing from the types described above.

While the invention has been illustrated and described as embodied in recording and reproducing systems and methods involving a transported recording medium, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. In an information-transforming apparatus of the type operative for converting between information in the form of signals and information recorded on a recording medium, in combination, a recording medium; a light source emitting a beam of light; beam-splitting means for splitting the beam of light emitted by the light source into two component light beams each having a different respective polarization plane; and means for projecting the differently polarized component light beams side by side onto respective adjoining portions of the recording medium, the recording medium bearing a plurality of pairs of tracks of recorded information extending in a predetermined direction, the distance between adjoining pairs of tracks being greater than the distance between the two tracks of each individual pair of tracks, further including means for effecting relative movement between the recording medium and the two differently polarized component light beams in said predetermined direction, deflection-control means operative for controlling the deflection of the two differently polarized component light beams in a direction transverse to said predetermined direction to cause the two component light beams to track respective ones of the two tracks of a predetermined pair of tracks, the deflection-control means comprising first and second optoelectrical transducers, routing means operative for routing the light leaving the recording medium from respective ones of the two differently polarized component light beams onto respective ones of the first and second opto-electrical transducers, error-signal generating means operative for receiving signals generated by the two transducers and forming an electrical error signal dependent upon the difference between at least one component of the signal produced by the first transducer and at least one component of the signal produced by the second transducer, and deflection-adjusting means receiving the electrical error signal and in dependence thereon automatically adjusting the transverse deflection of the two component light beams to cause the two beams to be projected onto respective ones of the two tracks of said predetermined pair of tracks with a spacing between the two component beams greater than the distance between the two tracks of each pair of tracks but smaller than the distance between adjoining pairs of tracks.

2. In an information-transforming apparatus of the type operative for converting between information in the form of signals and information recorded on a recording medium, in combination, a recording medium; a light source emitting a beam of light; beam-splitting means for splitting the beam of light emitted by the light source into two component light beams each having a different respective polarization plane; and means for projecting the differently polarized component light beams side by side onto respective adjoining portions of the recording medium, the light source comprising a laser having a beam path, the beam-splitting means and the projecting means comprising a first polarization beam splitter, a first modulator, a second polarization beam splitter and an objective arranged along with the recording medium in the beam path of the laser, and further including a third polarization beam splitter and means defining an additional beam path extending from an exit face of the first beam splitter to an entrance face of the second beam splitter and including in the additional beam path a first mirror, a second modulator and a second mirror; and further including two optoelectrical transducers each located in the path of light emerging from a respective face of the third polarization beam splitter.

3. In an apparatus as defined in claim 2, further including a quarter-wave plate in the beam path of the laser.

4. In an information-transforming apparatus of the type operative for converting between information in the form of signals and information recorded on a recording medium, in combination, a recording medium; a light source emitting a beam of light; beam-splitting means for splitting the beam of light emitted by the light source into two component light beams each having a different respective polarization plane; and means for projecting the differently polarized component light beams side by side onto respective adjoining portions of the recording medium, further including means for effecting relative movement between the recording medium and the two differently polarized component light beams to produce upon the recording medium a plurality of adjoining pairs of adjoining tracks of recorded information, with the distance between adjoining pairs of tracks being different from the distance between the two tracks of each pair of tracks.

5. In an apparatus as defined in claim 4, further including two light modulators each located in the light path of a respective one of the two differently polarized component means and operative for modulating the light of said beams projected onto the recording medium.

6. In an apparatus as defined in claim 4, further including a light modulator located in the path of the light beam emitted by the light source and operative for modulating light emitted by the light source.

7. In an information-transforming apparatus of the type operative for converting between information in the form of signals and information recorded on a recording medium, in combination, a recording medium; a beam of light; beam-splitting means for splitting the beam of light emitted by the light source into two component light beams each having a different respective polarization plane; and means for projecting the differently polarized component light beams side by side onto respective adjoining portions of the recording medium, the recording medium bearing at least one track of recorded information extending in a predetermined direction, further including means for effecting relative movement between the recording medium and the two differently polarized component light beams in said predetermined direction, deflection-control means operative for controlling the deflection of the two differently polarized component light beams in a direction transverse to said predetermined direction to cause both component light beams to simultaneously track the same track of recorded information, the deflection-control means comprising first and second optoelectrical transducers, routing means operative for routing the light leaving the recording medium from respective ones of the two differently polarized component light beams onto respective ones of the first and second optoelectrical transducers, error-signal generating means operative for receiving signals generated by the two transducers and forming an electrical error signal dependent upon the difference between at least one component of the signal produced by the first transducer and at least one component of the signal produced by the second transducer, and deflection-adjusting means receiving the electrical error signal and in dependence thereon automatically adjusting the transverse deflection of the two component light beams to cause the two beams to be projected onto respective adjoining portions of the same track of recorded information with each light beam incident upon both the respective portion of the track and also a portion of the recording medium located to a respective side of the track.

8. In an apparatus as defined in claim 7, furthermore including means for generating an electrical signal containing the recorded information by adding at least one component of the signal produced by the first transducer to at least one component of the signal produced by the second transducer.

9. In an apparatus as defined in claim 7, the routing means comprising optical means operative for distinguishing between the different polarizations of the light of the two component light beams and routing the differently polarized light from the two component light beams onto respective ones of the transducers.

10. In an information-transforming method for converting between information in the form of signals and information recorded on a recording medium, the steps of splitting a beam of light emitted by a light source into two component light beams each having a different respective polarization plane, and projecting the differently polarized component light beams side by side onto respective adjoining portions of a recording medium, the recording medium bearing a plurality of pairs of tracks of recorded information extending in a predetermined direction, the distance between adjoining pairs of tracks being different from the distance between the two tracks of each individual pair of tracks, further comprising the steps of effecting relative movement between the recording medium and the two differently polarized component light beams in said predetermined direction, and controlling the deflection of the two differently polarized component light beams in a direction transverse to said predetermined direction to cause the two component light beams to track respective ones of the two tracks of a predetermined pair of tracks, the controlling of the deflection of the component light beams comprising projecting the two component light beams onto respective ones of the two tracks of said predetermined pair with a spacing between the two component light beams which is greater than the distance between the two tracks of each pair of tracks but smaller than the distance between adjoining pairs of tracks, routing the light leaving the recording medium from respective ones of the two differently polarized component light beams onto respective ones of a first and a second optoelectrical transducer, generating an electrical error signal dependent upon the difference between at least one component of the signal produced by the first transducer and at least one component of the signal produced by the second transducer, and controlling the deflection of the two component light beams in dependence upon the value of the electrical error signal.

11. In a method as defined in claim 10, the step of routing comprising using optical means operative for distinguishing between the different polarizations of the light of the two component light beams to route the light from the two component light beams onto respective ones of the transducers.

12. In an information-transforming method for converting between information in the form of signals and information recorded on a recording medium, the steps of splitting a beam of light emitted by a light source into two component light beams each having a different respective polarization plane, and projecting the differently polarized component light beams side by side onto respective adjoining portions of a recording medium, further including the step of effecting relative movement between the recording medium and the two differently polarized component light beams to produce upon the recording medium a plurality of adjoining pairs of adjoining tracks of recorded information, with the distance between adjoining pairs of tracks being different from the distance between the two tracks of each pair of tracks.

13. In a method as defined in claim 12, further including the step of directing each of the two differently polarized component light beams through a respective one of two modulators and using the two modulators to modulate the component light beams.

14. In a method as defined in claim 12, further including the step of directing the light emitted by the light source through a modulator and using the modulator to modulate the light.

15. In an information-transforming method for converting between information in the form of signals and information recorded on a recording medium, the steps of splitting a beam of light emitted by a light source into two component light beams each having a different respective polarization plane, and projecting the differently polarized component light beams side by side onto respective adjoining portions of a recording medium, the recording medium bearing at least one track of recorded information extending in a predetermined direction, further comprising the steps of effecting relative movement between the recording medium and the two differently polarized component light beams in said predetermined direction to cause both component light beams to simultaneously track the same track of recorded information, the controlling of the deflection of the component light beams comprising projecting the two component light beams onto respective adjoining portions of the same track of recorded information with each light beam being incident upon both the respective portion of the track and also a portion of the recording medium located to a respective side of the track, routing the light leaving the recording medium from respective ones of the two differently polarized component light beams onto respective ones of a first and a second optoelectrical transducer, generating an electrical error signal dependent upon the difference between at least one component of the signal produced by the first transducer and at least one component of the signal produced by the second transducer, and controlling the deflection of the two component light beams in dependence upon the value of the electrical error signal.

16. In a method as defined in claim 15, further comprising the step of generating an electrical signal containing the recorded information by adding at least one component of the signal produced by the first transducer to at least one component of the signal produced by the second transducer.

17. In a method as defined in claim 15, said step of routing comprising using optical means for distinguishing between the different polarizations of the light of the two component light beams to route the light from the two component light beams onto respective ones of the transducers.

18. In a method as defined in claim 15, the routing means comprising optical means operative for distinguishing between the different polarizations of the light of the two component light beams and routing the differently polarized light from the two component light beams onto respective ones of the transducers.

* * * * *